May 19, 1953 W. GRUBER 2,638,955
REPAIR PATCH FOR RUBBER ARTICLES
Filed July 29, 1949
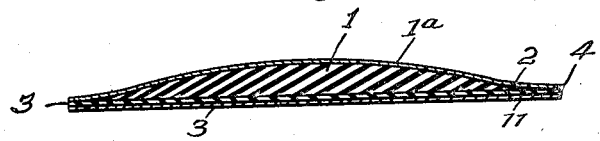
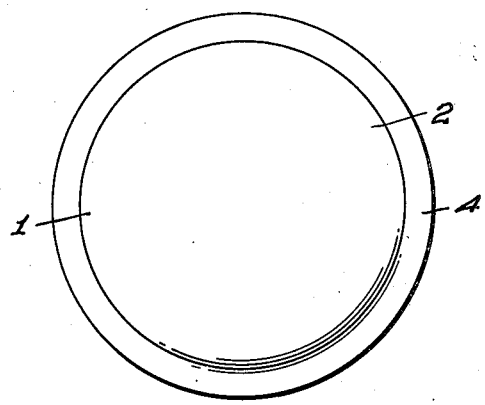
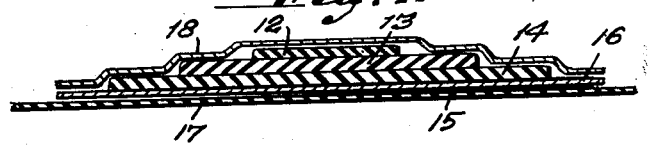
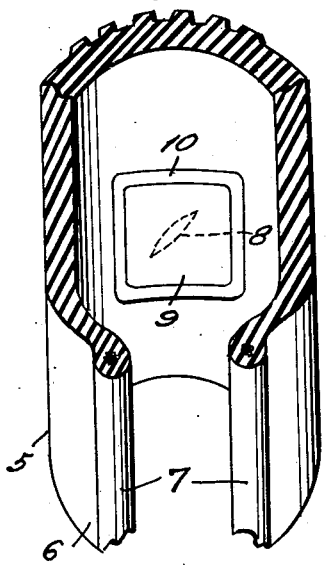
INVENTOR.
Willy Gruber
BY
Attorneys.

Patented May 19, 1953

2,638,955

UNITED STATES PATENT OFFICE 2,638,955

REPAIR PATCH FOR RUBBER ARTICLES

Willy Gruber, Munich, Germany

Application July 29, 1949, Serial No. 107,508
In France August 26, 1948

5 Claims. (Cl. 152—367)

The present invention relates to a repair patch for rubberized articles. More particularly it relates to a rubber patch for use in repairing pneumatic tubes of the type used in motor vehicle and bicycle tires.

Repair patches for many different purposes are known, especially patches for repairing pneumatic tire tubes, that consist of a main body of rubber and a connecting layer attached to the same by which the main body is connected with the surface of the article or tube to be repaired. Even if the patch has a tapered beveled rim, there is still the danger and it occurs again and again that, due to the great strain resulting especially in the case of motor vehicle tire tubes from fulling effect when driving, from shock due to vibration and bumping over holes in the roads and over obstacles, due to the fact that one side of the tire is used more than the other when the vehicle is proceeding around curves, one part of the outside rim of the patch gets loose and the patch then becomes more and more detached. It must be considered that the pressure in the tube, for example in large tires, is several atmospheres, and that this pressure can be considerably increased by the knocks and blows the tire receives in operation. Any fine tapered rim on patches, which have up to now been on the market, has, therefore, not sufficed in all cases as the tube has still shown too great a tension at the puncture owing to the thickening caused by the attached patch. The consequence was that, under the high pressure and under the circumstances already described and owing to the thickening and consequent tension at the puncture, the air sought a way out and detached the patch even at the fine tapered rim. Just in the case of a patch with an especially finely tapered rim, there is the danger of creases forming at the edge which are prejudicial to the adhesion of the edge to the tube without creases. The consequence is that due to the high pressure existing in the tube the air very soon finds a way out at the damaged spot and escapes from the tube.

However, great strain is also placed on patches applied to other parts, for example to the tops or covers of motor vehicles, owing to the fact that they are frequently folded and unfolded so that the patch can become detached inadvertently, resulting in leakage in rain and snow.

The foregoing disadvantages are overcome by the present invention, since the attaching or connecting layer applied to the repair patch is larger in size, for example having a larger diameter than the rubber body of the repair patch. In this case the larger rim diameter of the adhesive rubber attaching layer has the effect, where knocks, fulling, to which the tires are continually subjected, are concerned, of a bolster of buffer, equalizing the tension between the tube and the patch at the puncture. Besides, the connecting layer, namely the adhesive attaching layer, consisting of soft rubber is completely welded to the tube owing to the pressure existing in the tire so that it is impossible for it to become detached or for it to partially peel away.

In the attached drawing an example of the invention is to be seen. In the drawing:

Fig. 1 is a cross-section through a repair patch for motor vehicle tire tubes according to the invention, Fig. 2 is a plan view of same from above, Fig. 3 is a partial cross-section through the repair patch and on a very enlarged scale, Fig. 4 is a view of the interior of a portion of a motor vehicle tire with an attached cover patch, the affixing flanges or tire beads being partly cut away to offer a better view, Fig. 5 is a cross-sectional view through a modified form of patch, Fig. 6 is a cross-sectional view through the wall of a tire tube showing the modified patch attached to, Fig. 7 illustrates a further modification as a variant of the patch shown in Fig. 5.

With reference to the drawings, in Figure 1 the main or body layer 1 of the tire patch is shown as having a thin tapering rim 2. The numeral 3 denotes a thin connecting or attaching layer of rubber or similar substance applied to same, containing for example sulphur or sulphur composition and capable of establishing by a cold or hot method through vulcanization the connection of the rubber of the main body with the rubber of the tube which has to be repaired. The layer 3 is preferably 0.2–0.4 mm. thick for a patch of 4–6 cm. diameter.

According to the invention, the unvulcanized attaching or connecting layer 3 is larger in size than the main body 1—this is clearly shown by Fig. 2—so that there is an overlapping or laterally projecting rim 4, which preferably shows a somewhat larger coefficient of elongation than the rim zone 2. This gives an especially good transition from the surface and substance of the tube needing repair through the laterally projecting thin rim 4 of the attaching or connecting layer and the tapered rim zone 2 of the body layer to the main substance of the main body. This good transition guarantees that the repair patch will adhere well and lastingly to the tube and the effect is that, even if the puncture has to take up great strain placed on it as a result of vibration, fulling effect and the like, the repair patch cannot become detached.

Fig. 4 illustrates the interior of a tire 5 with the customary attaching flanges 6 and beads 7 and showing a damaged part 8 to which a repair patch 9 is applied. This patch also has a thin connecting layer as illustrated in Fig. 1. According to the invention, this connecting layer has an overlapping or laterally projecting rim 10 extending completely around the body layer of the patch and thus insuring the lasting adhesion of the repair patch 9 to the inside of the tire.

In a special modification the connecting layer has a different color from that of the body layer of the repair patch and/or the tube or tire needing repair so that at 4 and/or 10 there is a colored rim, for example a red or yellow rim. This has the technical advantage that even in a bad light a previously repaired puncture in the tube or tire can be recognized immediately and can be tested as to compactness.

Of course, in the case of all connecting layers of the repair patch, a detachable protective layer 11, for example of paper, cellophane or similar substance, can be applied over the connecting layer.

In a particularly advantageous system a thin cover layer 1a of paper, cellulose or similar substance is applied over the outside surface of the patch 1, which also covers the rim 4 of the attaching layer and which can be removed, for example by washing off, after the patch has been applied to the tube. This cover layer greatly supports the application without creases of even a thin outside rim on the patch as well as the firm adhesion of the rim 4 of the connecting layer to the tube.

With a modification the connecting layer has a greater coefficient of elongation than the main body.

The most suitable combination for cold vulcanisation is a main body layer 1 of vulcanized rubber and a connecting layer 3 of unvulcanized rubber containing sulphur or sulphur composition. As one particular modification the connecting layer consists of pure unvulcanized caoutchouc which is only able to act as connecting means between the patch and the article to be repaired when sulphur and accelerator agents are added just before the patch is applied to the article to be repaired. This kind of modification has the advantage that the patch has an almost unlimited durability.

For the purpose of hot vulcanisation the main body may consist of unvulcanized rubber.

In a further modification the main body of the patch consists of a plurality of superposed layers of unvulcanized rubber 12, 13, 14, decreasing in lateral dimensions and combined by a rubber solution, Figures 5 and 7. A connecting layer 15 as described before is attached to the lowermost layer, and has a larger diameter than the lowermost layer 13 or 14 respectively, and thus providing a projecting rim 16. A protective layer 17 and a cover layer 18 may be also provided similar to the layers 11 and 1a of Figures 1 and 3. Figure 6 illustrates how the layers 12 and 13 upon the application of heat and pressure melt together and in unison with the connecting layer 15 close a slit 19 in the wall $a$ of a tube and provide an enlargement 20 in the width of the patch.

Such repair patches are also suitable for the repairing of the tops of motor vehicles, rubberized covers or awning members, rubber coats, and rubber shoes.

Such repair patches are useful in combination with vulcanisation fluid, that is a solution of rubber in benzine, benzol or the like containing accelerators. Accelerators are ingredients well known in the art accelerating and facilitating vulcanisation. Preferably this fluid is put on the subject to be repaired in a thin layer and when dried, the repair patch is applied to it.

It is therefore clear that this invention provides a repair patch for rubber articles that comprises a body layer 1 of vulcanized rubber and a thin attaching or connecting layer 3 of flexible unvulcanized rubber. The body layer has a flat bottom and the attaching layer is secured thereto. Furthermore the body layer has a graduated thickness as clearly shown in the drawings including a central portion of substantial thickness in relation to the thickness of the attaching layer of unvulcanized rubber and a thin flexible perimetrical rim portion. Thus as shown, the upper surface of the body layer tapers laterally outwardly from the central portion to the periphery to form a thin tapered rim 2. The thin layer of unvulcanized rubber, that is the attaching or connecting layer, has a substantially greater area than the area of the body layer so that the perimeter of the body layer is disposed inwardly of the perimeter of the attaching layer to provide a thin flexible marginal rim of substantial width and of unvulcanized rubber that extends laterally outwardly of the tapered rim 2 of the body layer. This insures that the patch can effectively adhere to a rubber article to be repaired without knurling, wrinkling or loosening of the thin tapered rim of the body layer and with equalized tension existing between the body layer and the article to be repaired, particularly pneumatic tire tubes.

What I claim is:

1. A repair patch for rubber articles comprising a body layer of vulcanized rubber and a thin attaching layer of flexible unvulcanized rubber, said body layer having a flat bottom and said attaching layer being secured to said bottom, said body layer further having graduated thickness including a central portion of substantial thickness in relation to the thickness of the layer of unvulcanized rubber and a thin flexible perimetrical rim portion, the upper surface of said body layer tapering laterally outwardly from the central portion to the periphery to form the thin tapered rim, said thin layer of unvulcanized rubber having a substantially greater area than the area of the body layer so that the perimeter of the body layer is disposed inwardly of the perimeter of the attaching layer to provide a thin flexible marginal rim of substantial width and of unvulcanized rubber extending laterally outwardly of the tapered rim of the body layer so that the patch can effectively adhere to a rubber article to be repaired without knurling, wrinkling or loosening of the thin tapered rim of the body layer and with equalized tension between the body layer and the article to be repaired.

2. A repair patch for rubber articles as claimed in claim 1 and a removable protective covering layer on the outer surface of said attaching layer of substantially greater area than the area of the body layer.

3. A repair patch for rubber articles as claimed in claim 1, including a removable protective covering layer on the outer surface of said attaching layer, an additional removable protective covering layer on the outer surface of the body layer and both protective covering layers having a substantially greater area than the area of the body layer.

4. A repair patch for rubber articles as claimed in claim 1, in which the thin attaching layer has a thickness less than 1 mm. and the flexible marginal rim of the attaching layer that extends laterally outward of the rim of the body portion having a lateral extent substantially many times larger than the thickness of the attaching layer.

5. A repair patch for rubber articles as claimed in claim 1, particularly for repairing punctures in pneumatic tire tubes and said attaching layer having a color different than the color of the body layer so as to facilitate recognition of a previously repaired puncture in a tube.

WILLY GRUBER.

References Cited in the file of this patent

UNITED STATES PATENTS

| Number | Name | Date |
|---|---|---|
| Re. 17,859 | Dunlap | Nov. 11, 1930 |
| Re. 17,860 | Gross | Nov. 11, 1930 |
| 995,106 | Woodgates et al. | June 13, 1911 |
| 1,503,701 | Morton et al. | Aug. 5, 1924 |
| 1,629,335 | Brady et al. | May 17, 1927 |
| 1,897,927 | Domzalski | Feb. 14, 1933 |
| 2,012,935 | Smith et al. | Aug. 27, 1935 |
| 2,157,183 | Mullen | May 9, 1939 |
| 2,486,669 | Nassimbene | Nov. 1, 1949 |
| 2,582,770 | Cornell | Jan. 15, 1952 |

FOREIGN PATENTS

| Number | Country | Date |
|---|---|---|
| 129,195 | Great Britain | July 10, 1919 |
| 231,821 | Switzerland | Apr. 15, 1944 |
| 248,374 | Great Britain | July 22, 1926 |
| 640,563 | France | Apr. 2, 1928 |